US011059282B2

(12) United States Patent
Dikovsky et al.

(10) Patent No.: US 11,059,282 B2
(45) Date of Patent: Jul. 13, 2021

(54) COLORING OF THREE-DIMENSIONAL PRINTED OBJECTS

(71) Applicant: Stratasys Ltd., Rehovot (IL)

(72) Inventors: Daniel Dikovsky, Ariel (IL); Stanislav Shtilerman, Modiln (IL); Yoav Bressler, Tel-Aviv (IL)

(73) Assignee: Stratasys Ltd., Rehovot (IL)

( * ) Notice: Subject to any disclaimer, the term of this patent is extended or adjusted under 35 U.S.C. 154(b) by 60 days.

(21) Appl. No.: 16/458,072

(22) Filed: Jun. 30, 2019

(65) Prior Publication Data

US 2019/0322096 A1 Oct. 24, 2019

Related U.S. Application Data

(63) Continuation of application No. 15/112,729, filed as application No. PCT/IL2015/050087 on Jan. 26, 2015, now Pat. No. 10,363,729.

(60) Provisional application No. 61/931,634, filed on Jan. 26, 2014.

(51) Int. Cl.
| | |
|---|---|
| B33Y 10/00 | (2015.01) |
| B41M 5/00 | (2006.01) |
| H04N 1/60 | (2006.01) |
| B29C 64/112 | (2017.01) |
| B29C 64/386 | (2017.01) |
| B33Y 30/00 | (2015.01) |
| B33Y 50/02 | (2015.01) |

(52) U.S. Cl.
CPC .......... B33Y 10/00 (2014.12); B29C 64/112 (2017.08); B29C 64/386 (2017.08); B33Y 30/00 (2014.12); B33Y 50/02 (2014.12); B41M 5/0082 (2013.01); H04N 1/60 (2013.01); H04N 1/6011 (2013.01)

(58) Field of Classification Search
CPC ......... B33Y 10/00; B33Y 30/00; B33Y 50/02; H04N 1/60; H04N 1/6011; B29C 64/112; B29C 64/386; B29C 64/106; B41M 5/0082
See application file for complete search history.

(56) References Cited

U.S. PATENT DOCUMENTS

| | | | |
|---|---|---|---|
| 6,585,340 B1 | 7/2003 | Borrell | |
| 2002/0079601 A1 | 6/2002 | Russell et al. | |
| 2007/0260349 A1 | 11/2007 | John et al. | |
| 2010/0140852 A1 | 6/2010 | Kritchman et al. | |
| 2010/0195122 A1 | 8/2010 | Kritchman | |
| 2011/0104643 A1* | 5/2011 | Giordano | A61C 13/00 433/203.1 |
| 2013/0062801 A1* | 3/2013 | Giordano | A61C 13/0018 264/16 |
| 2013/0065200 A1* | 3/2013 | Giordano | B33Y 80/00 433/203.1 |
| 2013/0069264 A1* | 3/2013 | Giordano | A61C 13/0022 264/16 |
| 2013/0076817 A1* | 3/2013 | Olson | B41J 2/2054 347/12 |
| 2013/0328228 A1 | 12/2013 | Pettis et al. | |
| 2015/0138201 A1* | 5/2015 | Brown | G06T 15/08 345/426 |
| 2016/0339643 A1 | 11/2016 | Dikovsky et al. | |

FOREIGN PATENT DOCUMENTS

| | | |
|---|---|---|
| CN | 101063812 | 10/2007 |
| EP | 1252867 | 10/2002 |
| JP | 2003-159754 | 6/2003 |
| JP | 2013-075390 | 4/2013 |
| WO | WO 2015/111059 | 7/2015 |

OTHER PUBLICATIONS

Office Action dated Feb. 26, 2020 From the Israel Patent Office Re. Application No. 246922 and Its Translation Into English. (7 Pages).
International Preliminary Report on Patentability dated Aug. 4, 2016 From the International Bureau of WIPO Re. Application No. PCT/IL2015/050087.
International Search Report and the Written Opinion dated Apr. 2, 2015 From the International Searching Authority Re. Application No. PCT/IL2015/050087.
Notice of Allowance dated Mar. 6, 2019 From the US Patent and Trademark Office Re. U.S. Appl. No. 15/112,729. (11 Pages).
Notice of Reasons for Rejection dated Dec. 18, 2018 From the Japan Patent Office Re. Application No. 2016-548284. (4 Pages).
Official Action dated Jul. 10, 2018 From the US Patent and Trademark Office Re. U.S. Appl. No. 15/112,729. (14 pages).
Restriction Official Action dated Mar. 1, 2018 From the US Patent and Trademark Office Re. U.S. Appl. No. 15/112,729. (8 pages).
Supplementary European Search Report and the European Search Opinion dated Jul. 19, 2017 From the European Patent Office Re. Application No. 15740005.2. (10 Pages).
Translation dated Jan. 8, 2019 of Notice of Reasons for Rejection Dated 18 Dec. 2018 From the Japan Patent Office Re. Application No. 2016-548284. (3 Pages).
Brunton et al. "Pushing the Limits of 3D Color Printing: Error Diffusion With Translucent Materials", ACM Transactions on Graphics, TOG, XP055366828, 35(1/Art.4): 1-13, Dec. 2015.
Notice of Reasons for Rejection dated Aug. 27, 2019 From the Japan Patent Office Re. Application No. 2016-548284 and Its Translation Into English. (4 Pages).

(Continued)

*Primary Examiner* — Nathan L Van Sell

(57) ABSTRACT

A method of printing a three-dimensional (3D) color object, layer-by-layer, comprises: obtaining a 3D CAD specification defining a 3D geometry and a surface color distribution for the color object to be printed, defining regions on a surface of the color object; defining colors for each region based on the CAD specification; determining, using the 3D geometry of the specification, conditions applying at respective regions that are liable to cause color variation, such that using the colors as defined at the respective regions may give rise to a coloration error; selecting color corrections defined for respective determined conditions; correcting the defined colors; and printing the 3D color object with the color corrections.

9 Claims, 13 Drawing Sheets

(56) References Cited

OTHER PUBLICATIONS

Notice of Reason(s) for Rejection dated Jan. 26, 2021 From the Japan Patent Office Re. Application No. 2020-001301 and Its Translation Into English. (4 Pages).

* cited by examiner

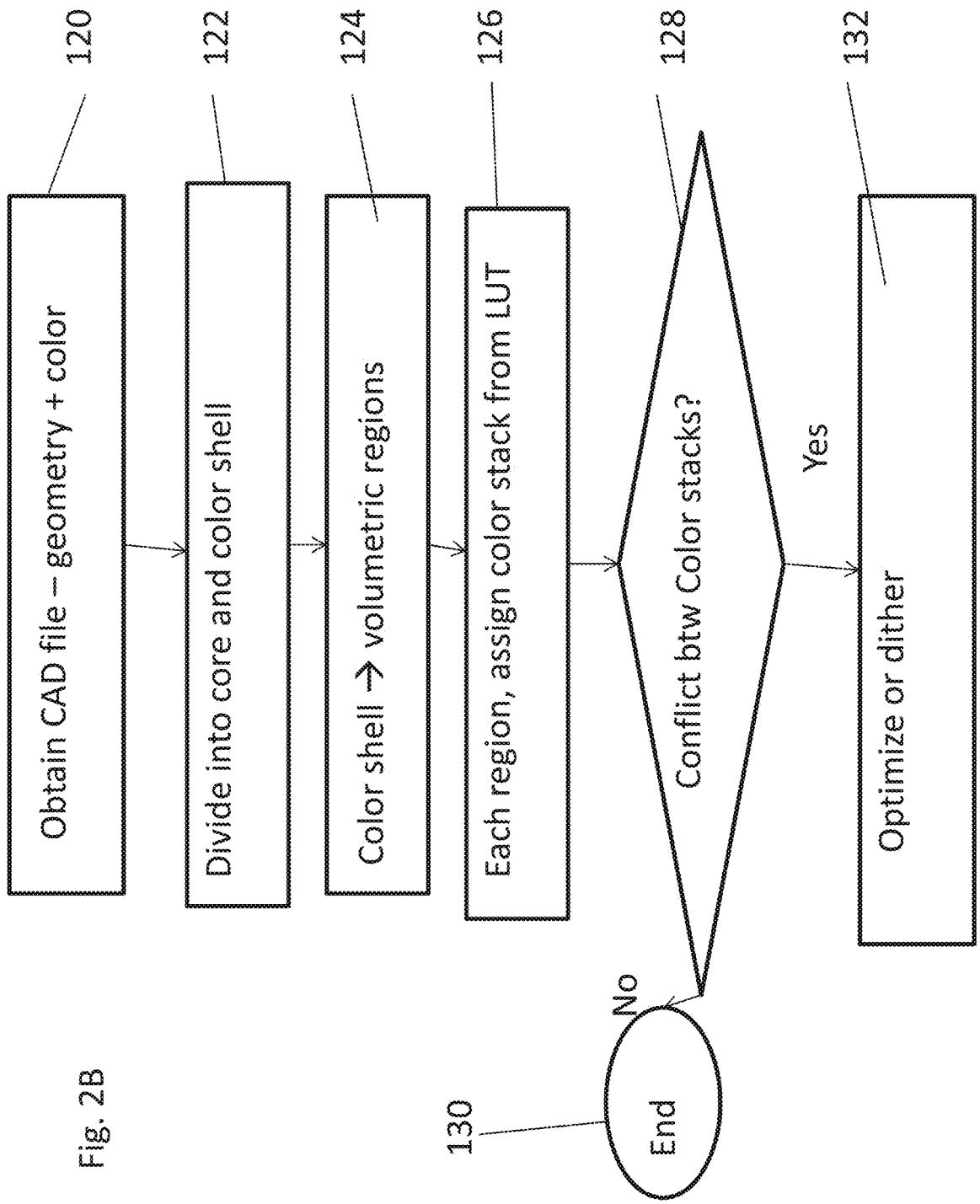

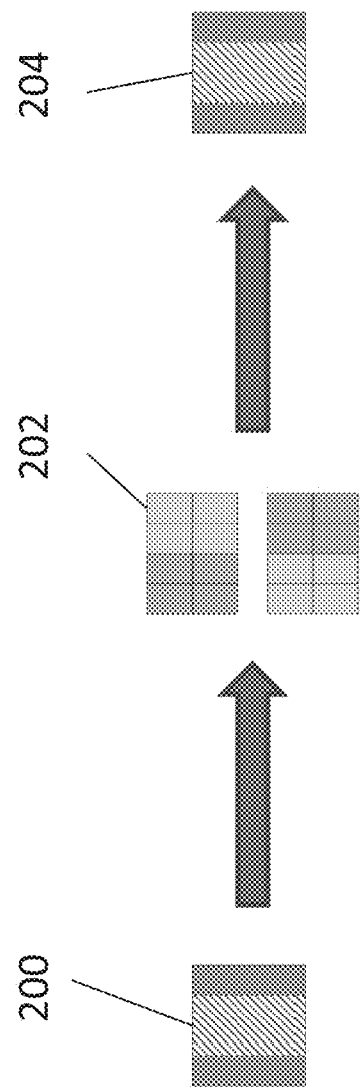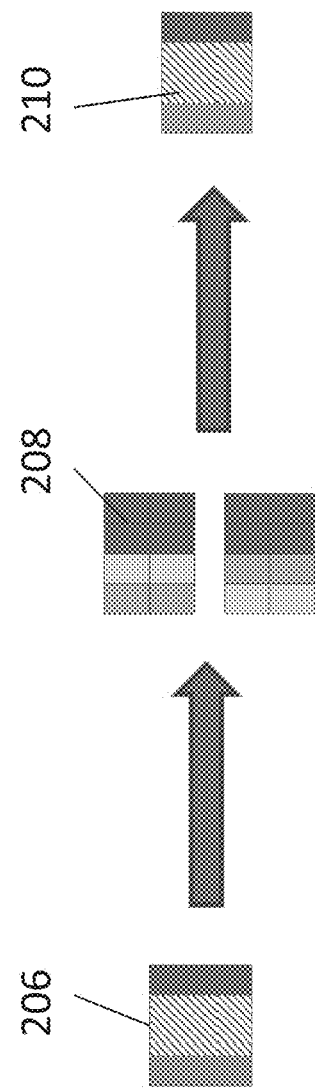

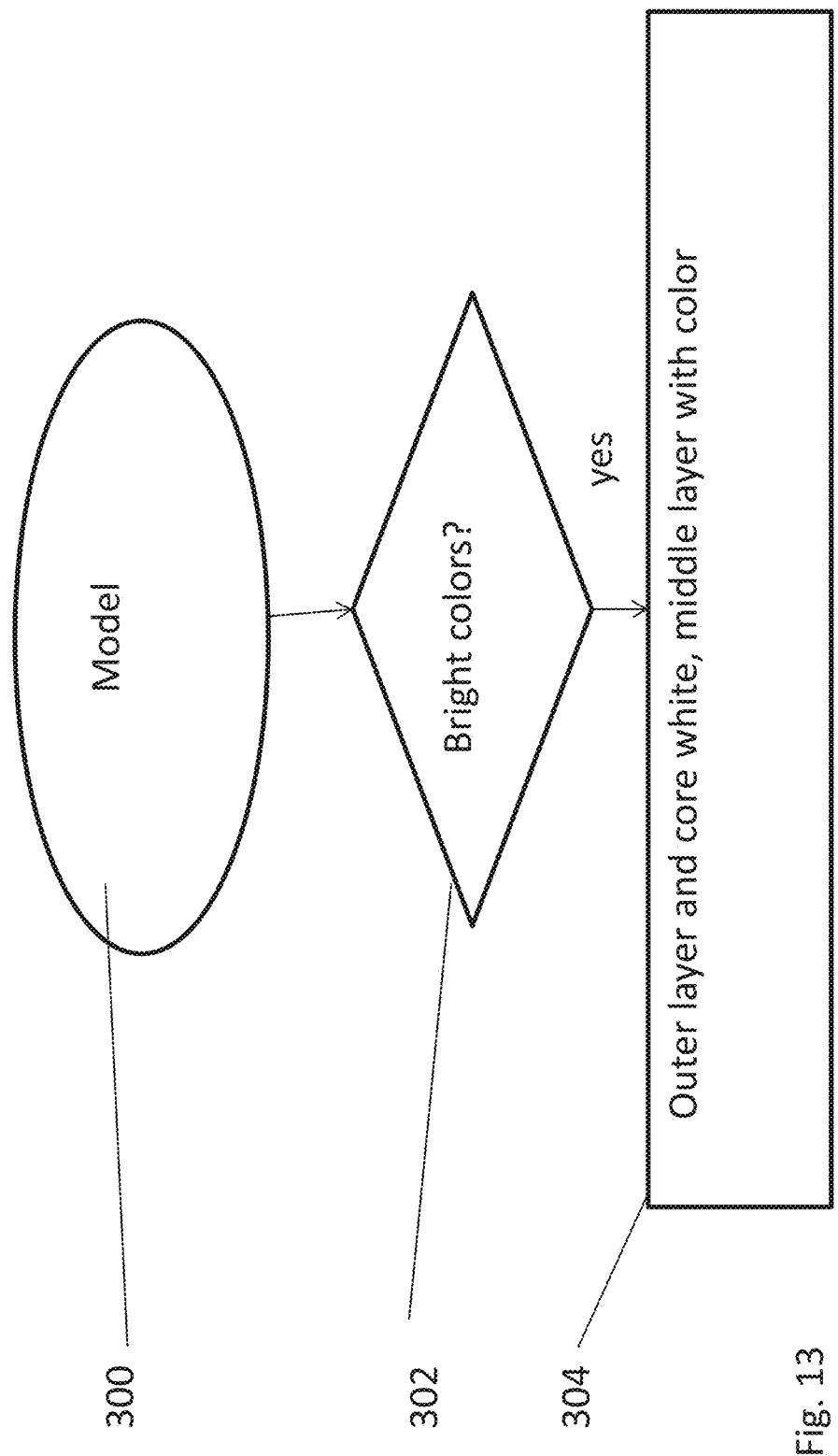

COLORING OF THREE-DIMENSIONAL PRINTED OBJECTS

RELATED APPLICATIONS

This application is a continuation of U.S. patent application Ser. No. 15/112,729 filed on Jul. 20, 2016, which is a National Phase of PCT Patent Application No. PCT/IL2015/050087 having International Filing Date of Jan. 26, 2015, which claims the benefit of priority under 35 USC § 119(e) of U.S. Provisional Patent Application No. 61/931,634 filed on Jan. 26, 2014. The contents of the above applications are all incorporated by reference as if fully set forth herein in their entirety.

FIELD AND BACKGROUND OF THE INVENTION

The present invention, in some embodiments thereof, relates to coloring of three-dimensional printed objects and, more particularly, but not exclusively, to a method of ensuring uniformity of individual colors in a multi-colored object.

In three-dimensional printing, an object is formed by selective deposition of layers using a 3D printing device. In many cases a multi-colored object is required, and art is known for producing multi-colored objects from a 3D printer. In general, transparent or white material is used to make the object and different faces of the object face different directions. The overall perceived color is contributed to by the surface layers and the layers immediately underneath and this gives rise to the problem, that at junctions between faces, or in thin parts of the structure where opposites faces are close together, colors from other regions may interfere to give a non-uniform color effect. Likewise radiation, such as UV radiation that may be used to cure the colors, may not radiate evenly over differentially-facing surfaces, or may be blocked or shaded from reaching some parts of the 3D objects.

Color uniformity has been dealt with in standard two-dimensional printing, but the issue of angles and adjoining faces does not apply. Furthermore, although a printing substrate may sometimes be transparent, if printing on opposite faces, an opaque substrate is used.

Color uniformity has also been dealt with in conventional manufacture. However, in conventional manufacture a prototype is built and then coloration can be corrected if needed. In three-dimensional printing the initial prototype is the final object and thus no such color correction option is typically available.

SUMMARY OF THE INVENTION

The present embodiments relate to making an initial selection of colors at individual pixels to compensate for the non-uniformity effects.

According to an aspect of some embodiments of the present invention there is provided a method of printing a three-dimensional (3D) color object, layer-by-layer, the method comprising:
obtaining a 3D CAD specification defining a 3D geometry and a surface color distribution for the color object;
defining regions on a surface of the color object;
defining colors for each region based on the surface color distribution;
determining, using the 3D geometry, conditions applying at respective regions that are liable to cause color variation, such that using the colors as defined at the respective regions may give rise to a coloration error;
selecting color corrections defined for respective determined conditions;
correcting the defined colors using the defined corrections, to compensate for respectively corresponding coloration errors; and
printing the 3D color object using respective corrected defined colors at each region.

In an embodiment, the color is printed over surface pixels and the conditions comprise colors in neighboring pixels.

In an embodiment, the color corrections are obtained from a look up table.

In an embodiment, the object is printed using a material having at least some transparency, color perception being defined by a depth into the surface, and each surface pixel being defined in terms of a predetermined number of voxels extending into the depth in a color stack, the condition being interference between different color stacks of neighboring 3D surfaces.

An embodiment may comprise obtaining the respective corrections from a look-up table defined for a corresponding color interference.

An embodiment may comprise obtaining the respective correction using a color change model.

An embodiment may comprise obtaining the respective correction using a dithering process between voxels of respectively interfering color stacks.

An embodiment may comprise generating different voxel combinations for respective pairs of interfering color stacks and finding a combination giving a least error with a design color.

In an embodiment, the finding a combination giving a least error comprises matching the respective different voxel combinations to find a combination requiring a minimal amount of voxel overwriting.

In an embodiment, the finding a combination giving a least error comprises placing least strong colors in voxel positions of maximal mutual interference.

In an embodiment, the conditions comprise either of surface angle and surface position relative to other surfaces.

An embodiment may comprise obtaining the corrections from a look up table defined for the member.

An embodiment may comprise:
obtaining the corrections by printing a test 3D object under the conditions; and
tabulating measured color deviations against applied colors.

An embodiment may comprise:
obtaining the corrections by obtaining factors responsible for causing errors under predetermined conditions;
calculating errors using the obtained factors; and
tabulating the calculated errors against the conditions.

An embodiment is provided for dealing with discontinuity issues that arise with bright colors or colors of high luminance. The method involves detecting the presence of bright colors or colors of high luminance, and where these bright or high luminance colors are detected, applying as corrections an outer layer of white and an underlying core of white on either side of a layer of the bright or high luminance colors According to a second aspect of the present invention there is provided a three-dimensional (3D) color printer for printing 3D color objects layer-by-layer, the printer comprising:

a specification input for inputting a 3D CAD specification defining a 3D geometry and a surface color distribution for the color object;

a region definer for defining regions on a surface of the color object;

a color definer for defining colors for each region based on the surface color distribution;

an error determination unit for determining, using the 3D geometry, conditions applying at respective regions that are liable to cause color variation, such that using the colors as defined at the respective regions may give rise to a coloration error;

a selector, for selecting color corrections defined for respective determined conditions;

a corrector for correcting the defined colors using the defined corrections, to compensate for respectively corresponding coloration errors; and the printer being configured to print the 3D color object using respective corrected defined colors at each region.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 2B is a simplified diagram illustrating a method of carrying out color correction according to an embodiment of the present invention in which the error-causing condition relates to interfering colors in neighboring pixels;

FIG. 6 is a simplified diagram showing an assumption used in color correction according to the present embodiments;

FIG. 7 is a simplified diagram illustrating the problem of not using color correction;

FIG. 12 is a simplified diagram illustrating a method of color correction for conditions that are due to radiation exposure susceptibility and the like; and FIG. 13 is a simplified flow chart illustrating a method of color correction specifically for bright colors according to an embodiment of the present invention.

DESCRIPTION OF SPECIFIC EMBODIMENTS OF THE INVENTION

Figure 1:
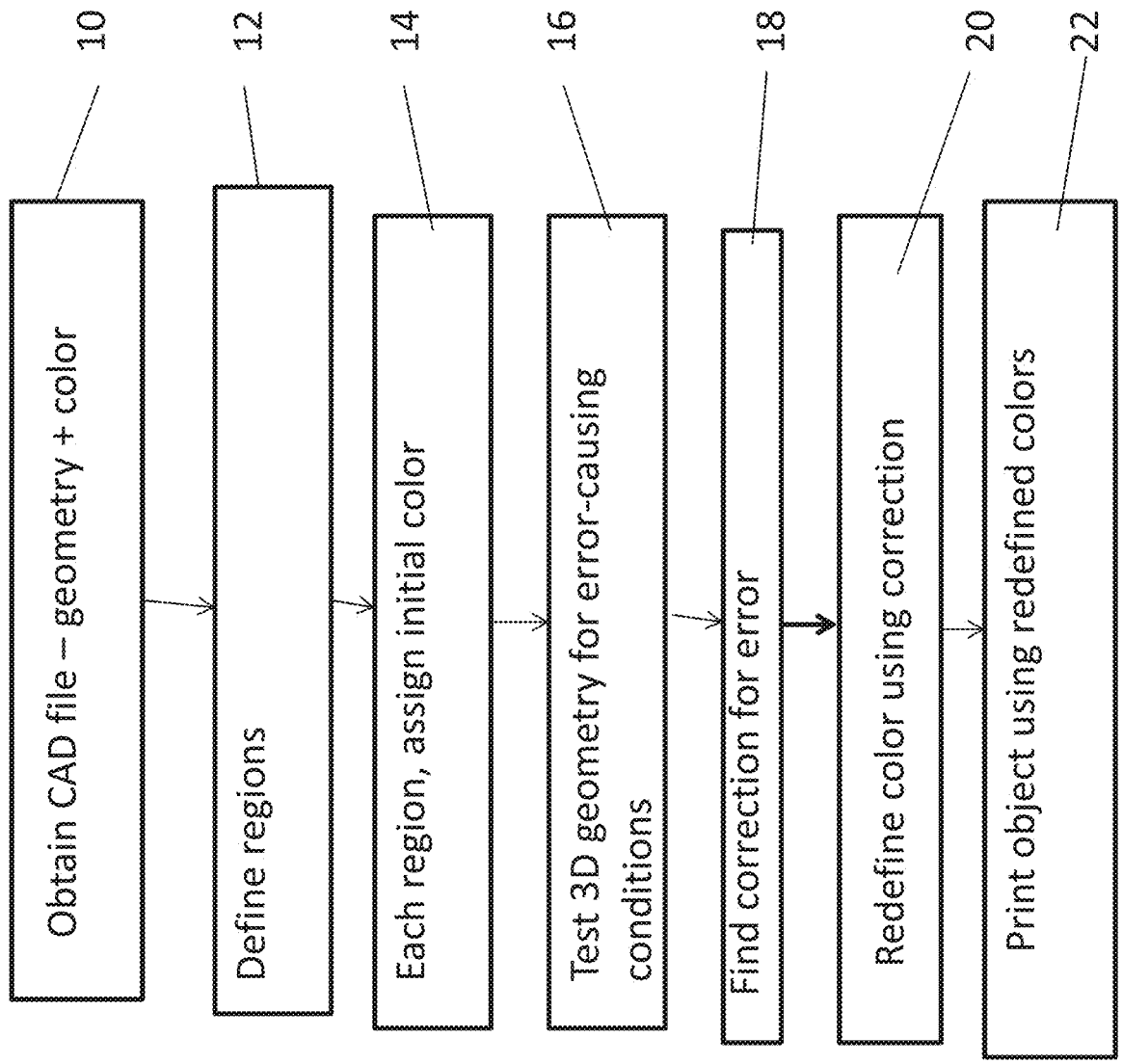
FIG. 1 is a simplified flow chart illustrating a method of correcting colors on a 3D printed object according to a preferred embodiment of the present invention.

The present invention, in some embodiments thereof, relates to coloring of three-dimensional printed objects and, more particularly, but not exclusively, to a method of ensuring uniformity of individual colors in a multi-colored object.

Color corrections are applied over the object to correct for conditions determined from the 3D geometry that are liable to cause coloration errors.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Referring now to the drawings, FIG. 1 is a simplified flow chart which shows a method of correcting colors on a three-dimensional (3D) color object, which is then printed layer-by-layer and colored using the color corrections.

Box 10 indicates obtaining a 3D CAD specification defining a 3D geometry and a surface color distribution for the object to be printed and colored.

Additionally, in some implementations, color is defined at the surface of an object, so that not just each location on the surface but also different angles relative to the normal at the location may be characterized by their own color properties.

Regions on the surface of the color object, typically areas sharing the same color and geometry, are defined, as per box 12.

The colors for each region are assigned based on the surface color distribution provided by the CAD specification, as per box 14.

Again, using the CAD specification, the 3D geometry is used to determine conditions applying at the different regions that are liable to cause color variation. In other words the geometry is scanned to find cases where using the colors as defined at the respective regions may give rise to a coloration error. For example, if two opposite surfaces are too close together, the colors may interfere. If the surfaces are awkwardly angled or hidden behind other parts, curing radiation may not reach the region.

In box 18, color corrections are obtained for the determined conditions.

The corrections may be calculated or may be obtained from look-up tables, as will be described in greater detail below.

In box 20, the colors are redefined using the obtained corrections, to compensate for the conditions and corresponding errors obtained in stage 18.

Finally, in stage 22, the object is printed using the corrected colors at each region.

The conditions causing errors may for example comprise colors present in neighboring pixels or voxels. As will be explained in greater detail below, the object may be printed using a material which is typically white or otherwise opaque but having some transparency. Color perception is thus affected by all colors within a depth into the surface. Each surface pixel can therefore have its color defined in terms of a certain number of voxels extending into the depth and forming what is referred to herein as a color stack, so that the condition causing color error may be interference between different color stacks of neighboring 3D surfaces. In particular, particularly at sharp edges or over thin parts, color stacks from the different surfaces may coincide.

The method may comprise obtaining corrections from a look-up table defined for a corresponding color interference. Alternatively the correction may be obtained using a color change model, or may involve using a dithering process between voxels of respectively interfering color stacks.

The method may involve generating different voxel combinations for respective pairs of interfering color stacks and finding a combination giving a least error with a design color, as explained in greater detail hereinbelow in respect of FIG. 9 and other figures. Thus, for example, the combination giving a least error may be obtained by matching the different voxel combinations to find a combination requiring a minimal amount of voxel overwriting.

Alternatively, as discussed in FIG. 8, hereinbelow, the combination giving a least error, may be obtained by placing least strong colors in voxel positions of maximal mutual interference. The term "least strong colors" includes lighter colors and colors of higher luminance.

Alternatively, the conditions may be surface angle, or surface position relative to other surfaces, and the error may be due to different exposures to curing radiation and the like. As before, the correction may be obtained from a look up table defined for the specific condition, say the given radiation exposure.

Figure 2A:
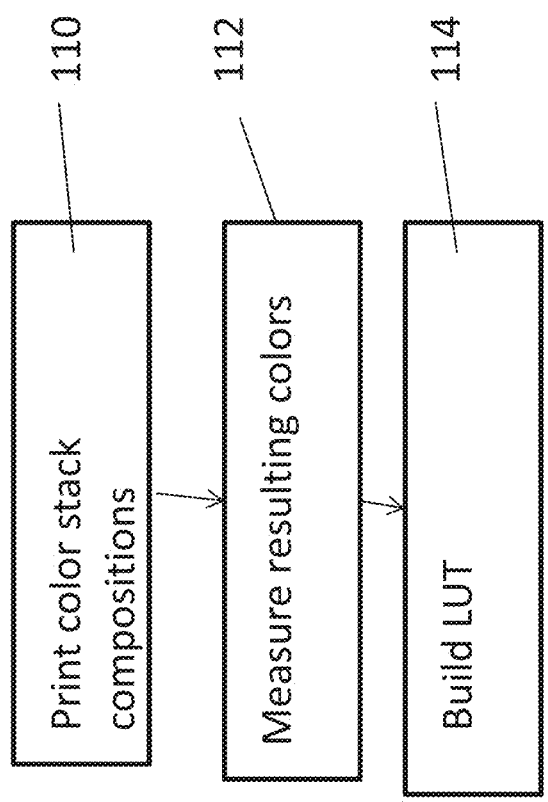
FIG. 2A is a simplified diagram illustrating an empirical method of obtaining the color corrections for different conditions for use in the method of FIG. 1.

One way of obtaining the corrections is empirically, as shown in FIG. 2A, by printing a test 3D object under said conditions, and tabulating measured color deviations against applied colors.

Figure 3:
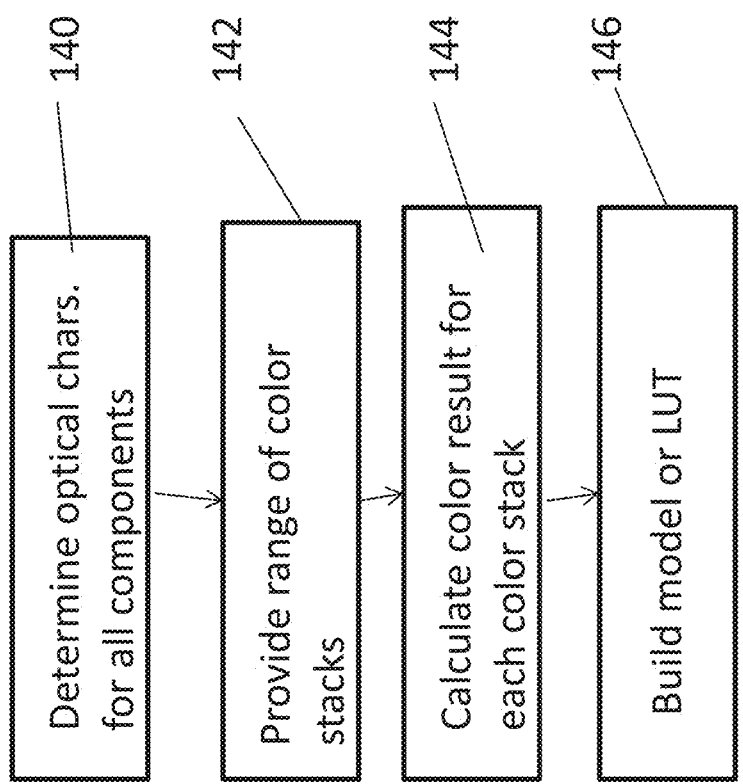
FIG. 3 is a simplified diagram illustrating a method of obtaining color corrections for the method of FIG. 1 or FIG. 2B, using analytical techniques.

An alternative way of obtaining the corrections is analytically, as per FIG. 3, by obtaining factors responsible for causing errors under predetermined conditions, calculating errors using the obtained factors, and tabulating the calculated errors against the conditions.

A further method of dealing with errors comprises separation of the model into three layers, an outer layer which is white, a middle layer in color, and the core in white. This has benefit in quality on subtle color changes. The input may be a vignette, characterized by the absence of abrupt color changes between neighbouring locations. It is, however, a desirable attribute of the printing process that no such abrupt changes are introduced as an artifact when none existed in the input. Nevertheless the kind of errors discussed herein include artifacts that are introduced when there are abrupt changes between different light colors or colors of high luminance, those colors that are close to white. The use of white layers above and below may remove such artifacts.

In greater detail, color repeatability in 3D printing is relatively accurate when comparing different material batches or different printers and print events. However, the coloring may exhibit larger tint deviations over the different regions of the printed geometry. One of the reasons for color deviation is a cross-talk between proximate surfaces of thin geometries, i.e. the influence of one color surface on another due to the partial transparency of the color material.

The present embodiments may account for the expected color deviations and may then modulate the color composition in order to obtain optimal appearance of the final parts.

The appearance of a 3D printed color part is typically a result of the composition of the outer regions of the printed part. Since the printed materials are not completely opaque and have some degree of transparency, the visible color depends not only on the outermost material segment, that is the droplet or voxel or combination of droplets or voxels, but also on further in material segments. The extent of depth to which the underlying colored segments affect the part appearance may be termed as the extinction depth. Naturally, the extinction depth is proportional to the transparency of the colored material. Thus, for a given part and given set of color materials we can define an outer region, i.e. color shell, which determines the part's appearance. The thickness of the shell may be about equal to the extinction depth of the given materials.

When materials of different color are placed inside the color shell volume, their overall optical properties, such as light refraction, reflection, absorption, diffusion, etc. may be considered in order to predict the resulting surface color. The appearance of each point on the surface is dictated by the stack of underlying color material segments, i.e. color stack. It should be noted that in thin geometries some color material segments may affect more than one surface—e.g. in a thin wall the inner segments may affect both opposite faces of the wall. That is to say two different surfaces may share the same color stack. This phenomenon is commonly termed as color cross-talk.

Therefore, in order to produce a correct representation of color in 3D printed parts, the present embodiments provide ways to relate the color as it appears in a point on the part surface to the composition of the underlying color stack. One way of obtaining such a relationship is by using an analytical approach, where the optical parameters of the color stack components are fed into the appropriate physical equations. Another way is by using an empirical approach, where the different stack variations are printed and measured by colorimeter.

Once the relationship between the composition of the color stack and the visible color is established, it is possible to populate the color shell with color stacks to match the required colors. Frequently during the population two or more color stacks may collide, especially when the part geometry contains thin features and/or when the extinction depth is large. In this case an algorithm may be used to refine the available color stacks and find the combination that optimally satisfies the requirements of all surfaces.

Reference is now made to FIG. 2A, which is a simplified diagram showing an example of the empirical method discussed above, namely a method for color 3D printing which involves building a look up table using color measurements.

In FIG. 2A, color calibration targets are printed using various color stack compositions 110. Then the resulting colors are measured 112, say using color spectrophotometry, spectrophotometry and placed in the look up table 114. The color value may be represented in any suitable way, including standard RGB color coordinates or CIE Lab, HSL, LCH or any other.

Reference is now made to FIG. 2B, which is a simplified flow diagram showing how to use the resulting LUTs to calculate the required printed color stack composition for each region of the color shell.

Initially, the CAD file describing the 3D geometry and its color texture is received 120.

Then the geometry is divided 122 into a core and a color shell.

Subsequently, the color shell is divided—box 124—into volumetric regions.

Then the LUTs are used—box 126—to assign each region with a color stack that results in an optimal (i.e. min dE) reproduction of the requested colors.

The design is tested for conflicts between color stacks 128, to find instances in which the color stack for one region enters the color stack of another region. That is to say it is possible to determine and mark accordingly all regions where colors stacks conflict, by studying the 3D geometry that was determined in boxes 120 and 122.

If there are no such regions then the procedure finishes 130. In case of conflict between adjacent color stacks, one option is to select a combination of color stacks that optimally reproduce the requested colors. Another option involves color dithering as will be discussed in greater detail below.

Reference is now made to FIG. 3, which is a simplified flow chart showing an example of a method for color 3D printing using the analytical method discussed above.

The method comprises determining 140 the optical characteristics for all color material components used in the 3D printing, in particular the layering material and the color components but also any coatings and any other materials that may be involved.

A range of color stacks is provided 142. Then the optical characteristics are used analytically to calculate the resulting colors for each of the color stacks in the range 144. It may be possible to express the results as a mathematical model or formula. However it is not always possible to arrive at such a model and if not then a look-up table LUT may be constructed—146.

The look up table or model is then used as discussed above in respect of FIG. 2B.

Figure 4:
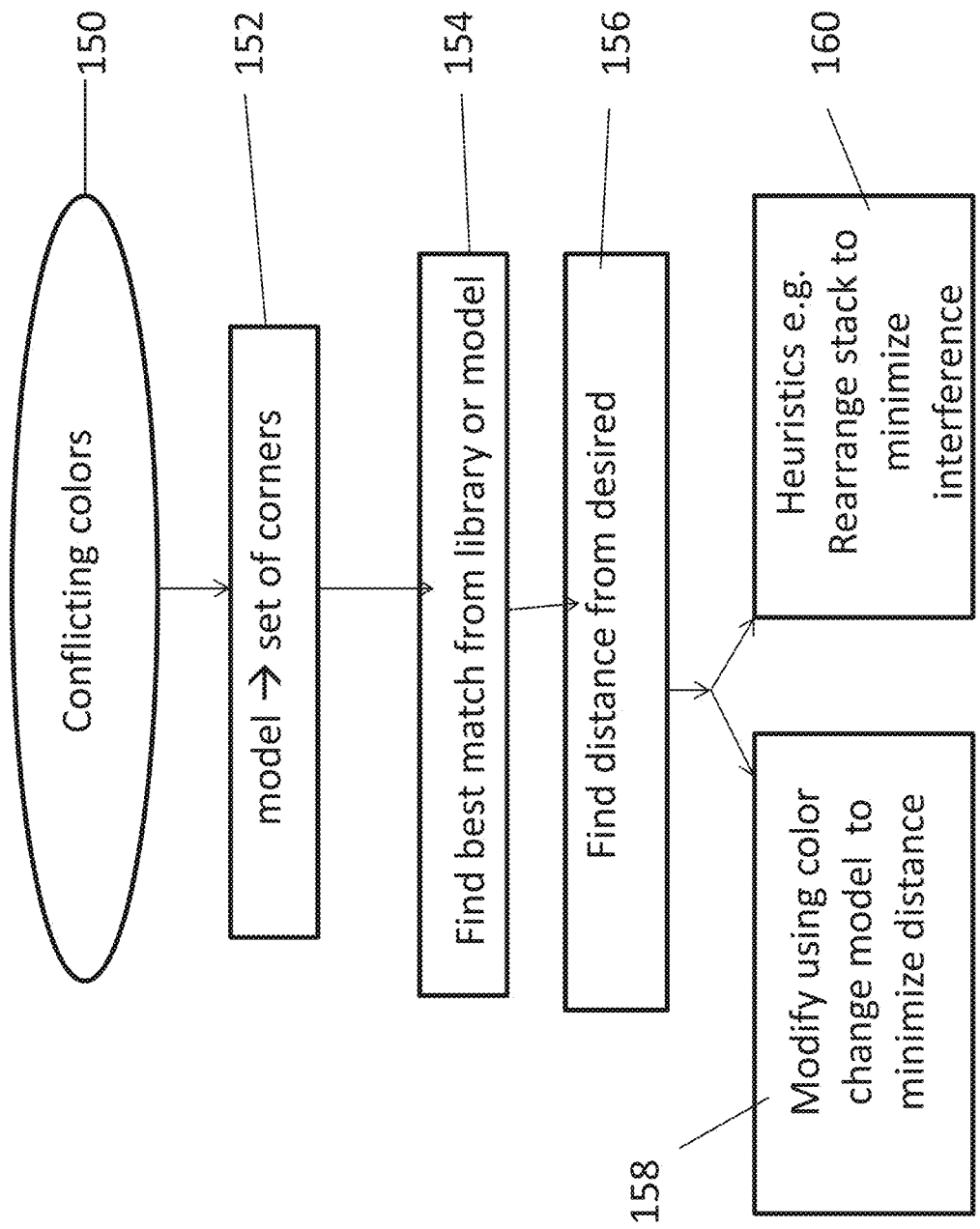
FIG. 4 is a simplified diagram illustrating an alternative method of carrying out color correction according to an embodiment of the present invention in which the error-causing condition relates to interfering colors in neighboring pixels.

Reference is now made to FIG. 4 which illustrates a method of building a color stack when the materials in the 3D object are at least somewhat transparent and the color stacks interfere with each other.

The problem definition is to find a method to color thin walls to have different colors on either side, and the color on each face appearing as intended irrespective of the color on the opposite side.

In the method, a color stack having a depth of n voxels is defined to paint the wall with a non-transparent color. Any wall having a thickness <2*n has a problem of being colored from both sides if the colors are different since both sides share some of the pixels of the color stack.

A table or model may be used to directly specify the appearance of a limited library of color combinations. Consider a three-way corner at the intersection of three colored planes. For six basic colors there are about a 100 interesting combinations of colors for the corner. This is a manageable number, and one possibility is to provide a factory solution for each variation, say as a lookup table. A real model may comprise corners of arbitrary color, and interpolation or heuristics can then be used to supplement the lookup table. For example given a set of colors each side needs in its stack, one may order the stack so that the lighter colors are placed in the inner layers, so that the shared colors have as small an influence as possible.

Referring now to FIG. 4, for the case of conflicting color stacks 150, one takes each model to be printed and to be colored with a given set of inks and decomposes 152 the model definition into a set of corners.

Each corner may be composed of a set of facets, and may be a thin wall of substantially parallel facets. For each corner a library of corners as described above is consulted to find—as per box 154—the best match in the library or from the model.

A distance is then measured—box 156—between the specified color and the color provided by the library. Distance measure may be according to criteria including a measure of distance of color per facet.

The library provided color stack is then modified to better fit the actual color specified, and two alternatives for such modification are shown in alternate boxes 158 and 160.

The method of box 158 uses a model predicting color change as a function of inks.

For example:
To increase Lab a*, add magenta ink
To increase Lab b*, add yellow ink
To decrease Lab L*, add black ink and
To increase Lab L*, add white ink The method of box 160 uses heuristics. For example one may place lighter colored ink at the inner layers of the stack where the highest interference occurs, to minimize that interference.

It is noted that if the wall is thicker, so that only two facets have a significant influence on the voxel color then a much simplified model may be used.

Figure 5:
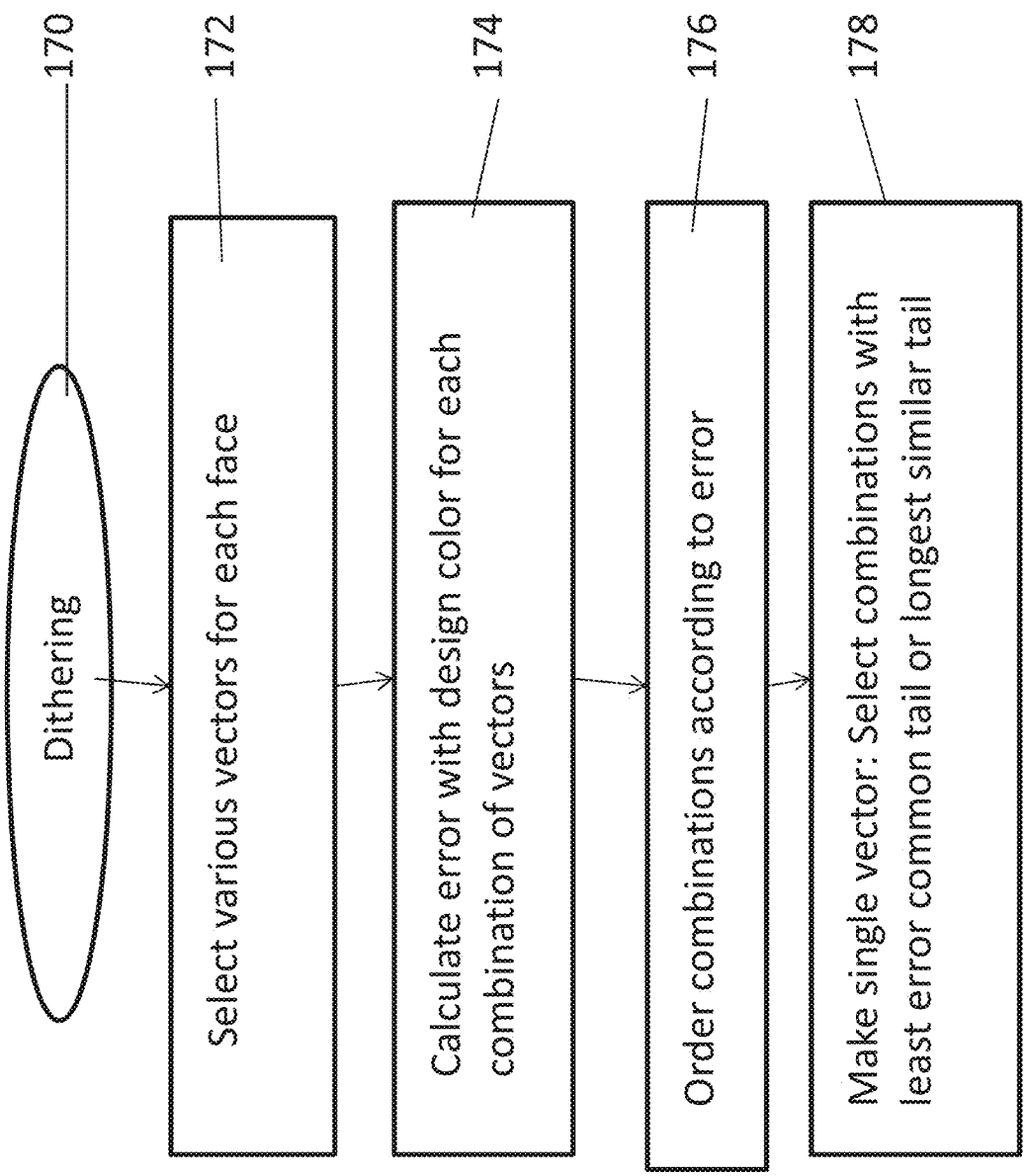
FIG. 5 is a simplified diagram illustrating a further alternative method of carrying out color correction according to an embodiment of the present invention in which the error-causing condition relates to interfering colors in neighboring pixels.

Reference is now made to FIG. 5 which illustrates dithering, again for use where there are conflicts between color stacks.

The 3D object may typically be built from white and somewhat transparent model material, surrounded by a colored depth region, where the colored depth region makes up the color stack. As before, the question is how to color the stack when parts of the stack are shared with other surfaces.

The support color may be chosen to provide the best match to the designed object surface color. As discussed, the color diffuses via the layers immediately under the surface, distorting the color.

The aim is to find 170 a dithering vector that provides a best match. FIG. 9 below shows a worked example of the method of FIG. 5. FIG. 9 shows examples of different dithering vectors that can be selected.

In constructing the vectors, each surface color may be presented by a size n (n=6 in the example) dithering vector of voxels which are semi-transparent. One may assume a very simple mathematic model where the influence of voxels on the final color geometrically decreases while pixels go deeper inside model. More complicated models may take into account the different size and transparency of voxel on different directions.

For every color channel we may calculate the color according to $C=C1+C2/a+C3/a*a+ \ldots Cn/(a^n)(1)$, where Cn can be 0 or 1.

A thick wall is defined as a wall with thickness $n*V<T<2*n*V$, (V the voxel size). In such walls the dithering vectors for opposite sides intersect and can be combined. For a wall $<n*V$ we can decrease the n parameter.

In box 172 one calculates the color produced by every combination of voxels and then in box 174 finds an error with respect to the required design color. It is noted that there are $2^n$ possibilities, which is a manageable number in computing when n<10. The number of possibilities may be decreased if necessary using certain heuristics, depending on the required surface color.

After calculating the color and error the good matches are combined in the separate channels into single vectors. In order to determine the good matches the vectors are ordered in box 176 according to the errors found above, and only the good vectors in the upper part of the list are selected for combining.

In box 178 having found those combinations with small enough errors over the desired colors on both surfaces, we now look for those vectors which have the same tails, that is have common colors in the inner part of the color stack so that when they overwrite, no changes need to be made. If there is such a vector combination then the combination is selected as the best fit. If there is no such combination then the combination with the longest length common tail is selected instead, so that minimum overwriting is needed. The size of tail can be calculated for every wall as $K=2*n-T/V+1$. The chosen vectors provide a dither, thus unifying their K-tails.

A sort of brute force alternative to the above may be used when the model of surface colors starts to deviate from the separate in-depth voxel colors, or the required calculations are too complex. Predefined vectors with different lengths (from n to 2*n) may be used which produce the best possible saturated colors from both sides. Such vectors may produce the colors on either side, and then brightness and saturation can be provided by adding black and white pixels.

FIGS. 6-9 illustrate different examples of relating a color stack to desired colors on oppositely facing thin walls.

FIG. 6 illustrates an initial assumption. A design color 200 leads to generation of a color stack 202. Color stack 202 generates surface colors 204. The printed pixels are partially transparent, so that a specific color can be formed by overlay of pixels of different colors. The same green color is formed from an overlay of yellow-cyan or cyan-yellow.

That is to say, the assumption is that the exact order, meaning which color is on the surface and which color is underneath, has only secondary importance, slightly affecting the shade of the resulting color but no more.

In FIG. 7 the design faces require the colors shown in block 206. The transparency goes beyond just a couple of pixels and can cause cross talk between adjacent areas of a geometry. Color stack 208 is set up naively to provide each surface with the correct color but ignoring the opposite surface and the adjoining pixels. In this case, both facets have reduced saturation, due to the presence of underlying colors, and the end result 210 is quite different from the design result 206.

Figure 8:
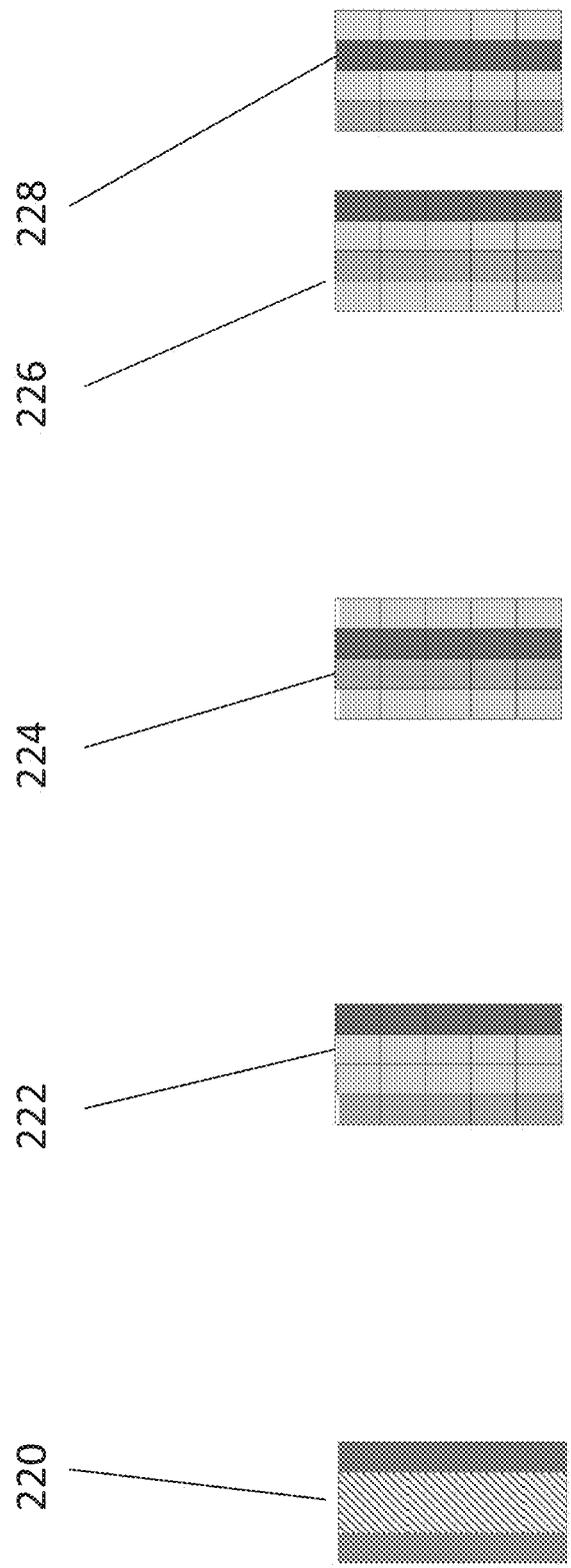
FIG. 8 is a simplified diagram showing an example of how different arrangements of voxels in a color stack can lead to the same surface colors.

Reference is now made to FIG. 8, which shows four different options for generating a specified pair of colors for opposite sides of a thin wall. Specifically, a target 220 requires a left face in green and a right face in orange, Green being Cyan+Yellow, and orange being Magenta+Yellow.

Four possible solutions are shown. In option 222 the wall colors are formed with the yellow pixels inside as common colors on the inside of the stack, and cyan/magenta outside.

In option 224, the wall colors are formed with the yellow pixels outside and cyan/magenta inside.

In options 226 and 228, the wall colors are formed with one column of yellow pixels outside and the other inside.

If each wall, or facet, is dithered separately, without taking in account adjacent facets, the resulting arrangement can be any one of the four options 222 to 228, or a mix between these options. But the most accurate color reproduction is achieved in option 222, where the underlying color is mutual for both of the facets, thus resulting in minimal cross-talk. In fact the solution of 222 satisfies the common tails algorithm of FIG. 5 and also the heuristic solution of option box 160 in FIG. 4, where the lightest colors are placed in the middle.

Figure 9:
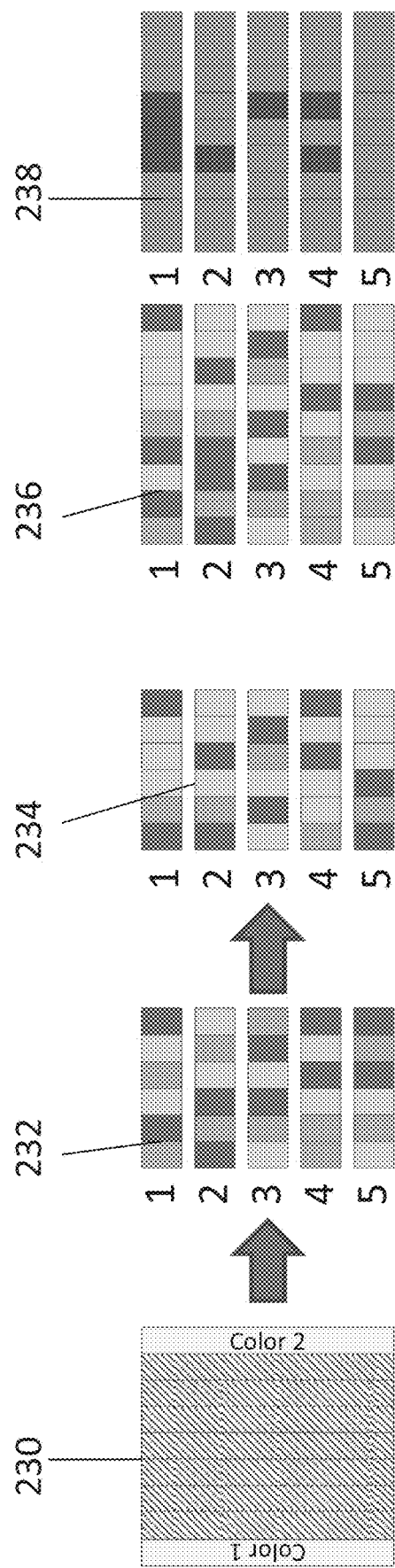
FIG. 9 is a simplified diagram illustrating dithering according to the method of FIG. 5.

FIG. 9 is an example using the tail matching algorithm of FIG. 5 above. This example shows that a smart refining of dithering options, that takes into account all collisions between neighboring dithering stacks can produce an optimal arrangement, where the final CMY composition over the two surfaces is more consistent with the requested value. The design target is an object 230 being 9 pixels wide and having different colors on opposite facets. The system uses CMY parent colors, and a typical dithering depth=6 pixels.

Five left facet dithering options are shown, 232 where Color1, the target color=2C+2M+2Y.

Five right facet dithering options are shown where color2=1C+2M+3Y.

Item 236 shows the five resulting arrangements when the two 6 px-deep dithering are combined, and in the event of conflict, the left option is overwritten by the right. At 238, matching pixels of 236 are shown in a first shading and replaced pixels are shown in a second shading. Version #5 does not require any replacement of pixels, all are green, and thus has the best match.

Figure 10:
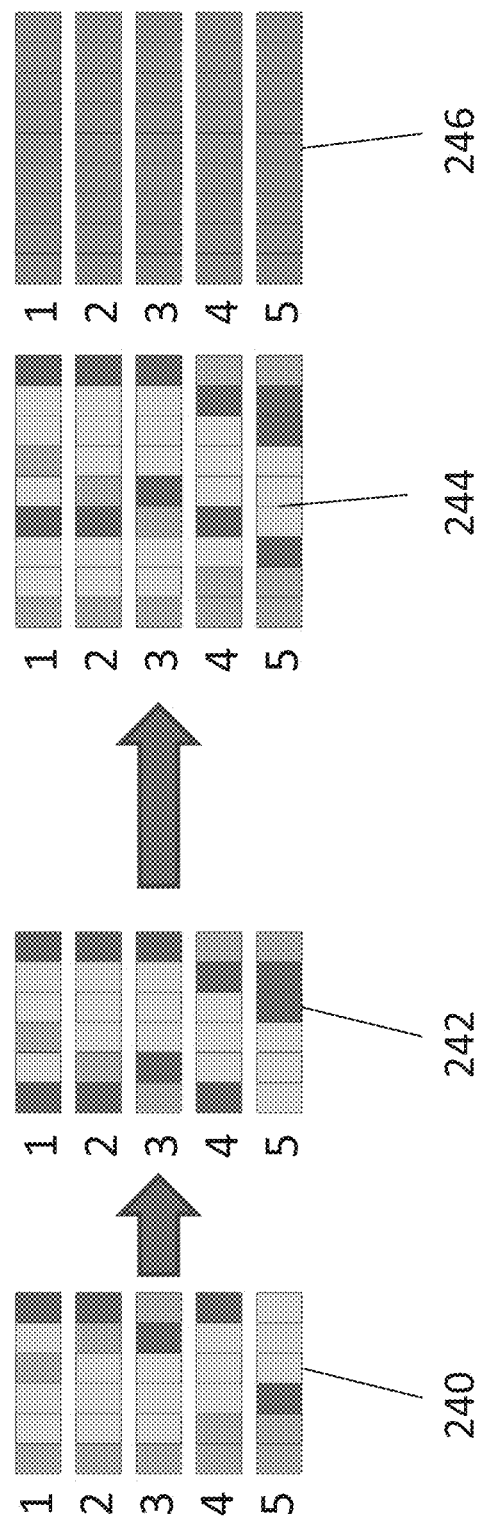
FIG. 10 is a simplified diagram illustrating a further example of dithering according to the method of FIG. 5.

Reference is now made to FIG. 10, which is a simplified diagram showing a further series of five dithering options for two specified colors on opposite faces. 240 shows five left facet dithering options for a Color1=2C+1M+3Y. 242 shows five right facet dithering options for a color2=1C+2M+3Y. 246 shows the combination vectors, and 238 shows that, in this case, all pairs make perfect match. Thus we can refine the best option according to additional parameters. For example, we may prefer having the brightest color inside, therefore choosing arrangement #5.

As mentioned above, while color reproduction is relatively accurate (dE<3) when comparing different material batches or different printers and print events, it may exhibit larger tint deviations (dE<8) over the different regions of the printed geometry. Another reason for these deviations, other than interference between pixels in the color stack, is to do with the orientation of the printed surfaces, the presence of neighbor support material (glossy or matte) and the amount of UV exposure.

Fortunately, the resulting color shade is frequently related to the part geometry and the tray layout, in which neighboring part geometries may affect UV exposure, for example, in a predictable way. The present embodiments thus account for the expected color deviations and dynamically modulate the colorant balance to compensate for the angles and the layout, thereby to aim at a uniform appearance of the final parts.

Currently, the simplest way to form different colors is to populate the printed voxels in a random manner according to a lookup table (LUT) that correlates between the requested color and the corresponding concentrations of each component. A red color, for example, may be formed by mixing 40% Magenta and 60% Yellow. The LUT is prepared by printing different compositional variations and measuring their color.

In addition, the precise coloring is applied only to the outer region, the surface and immediate sub-surface of the part, as discussed above, while the inner bulk composition has no importance and can be constant or can vary depending on considerations that are not relevant to the present embodiments. A color correction for a given part region may thus involve modification of the requested concentrations in the outer, surface, regions of the part. Such regions are actually thin volumes that extend along the normal to a point on the part's surface.

There are different ways to introduce the color corrections. One possible way is building different LUTs for different print variations. The tables may be built using empirical measurement of the situation. Consider the UV exposure example. To make an effective color correction strategy, one may print a target to be used for the LUT calculation under minimal, medium and high UV exposures. The color deviations and required corrections are placed in the table for the different conditions.

Then the 3D CAD design for a specific object is provided. Each point on the surface geometry for a given tray is analyzed to calculate the expected UV exposure. Then the requested color value of the point is read and translated into requested color concentrations using the relevant LUT that matches the expected radiation exposure.

Figure 11:
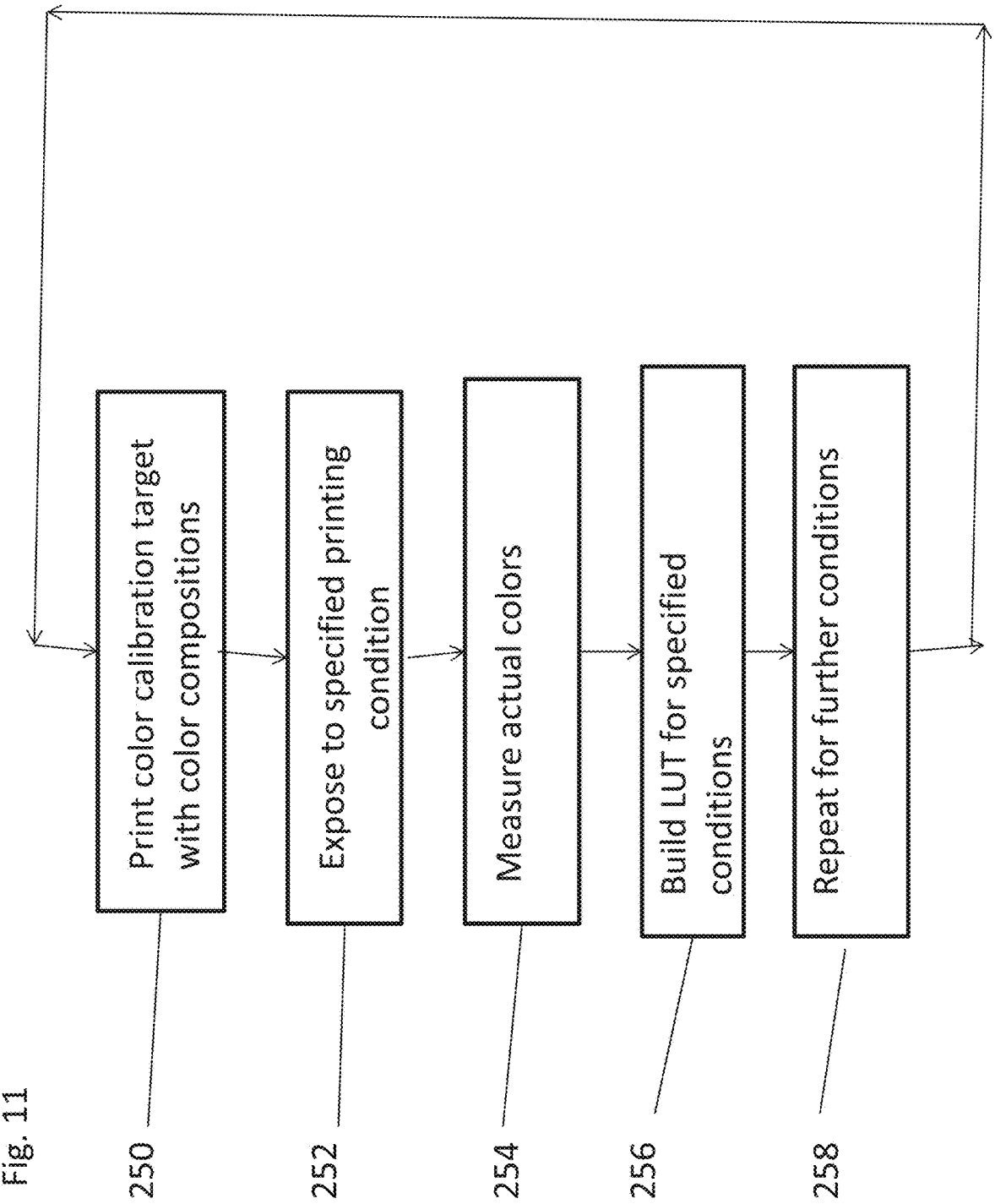
FIG. 11 is a simplified diagram illustrating a method of building up a look up table for color correction in the case of conditions that are due to radiation exposure susceptibility and the like of the given object surface.

Reference is now made to FIG. 11 which illustrates a flow chart for building the LUT. The method for color 3D printing comprises building the LUT to relate color value for example, RGB, CIE Lab, RGB, Grey Value or any other suitable way of representing color, to actual printed color composition (CMY, white, black or other) by printing color calibration targets that contain various printed color compositions—box 250—exposing to different printing conditions such as radiation doses, box 252, and measuring the resulting color value using a colorimetry device, box 254. The measurements against the color compositions are tabulated together in the LUT, box 256.

The LUT building process is then repeated for different printing conditions, such as UV exposure level, sample orientation on tray or print mode (gloss/matte).

Figure 12:
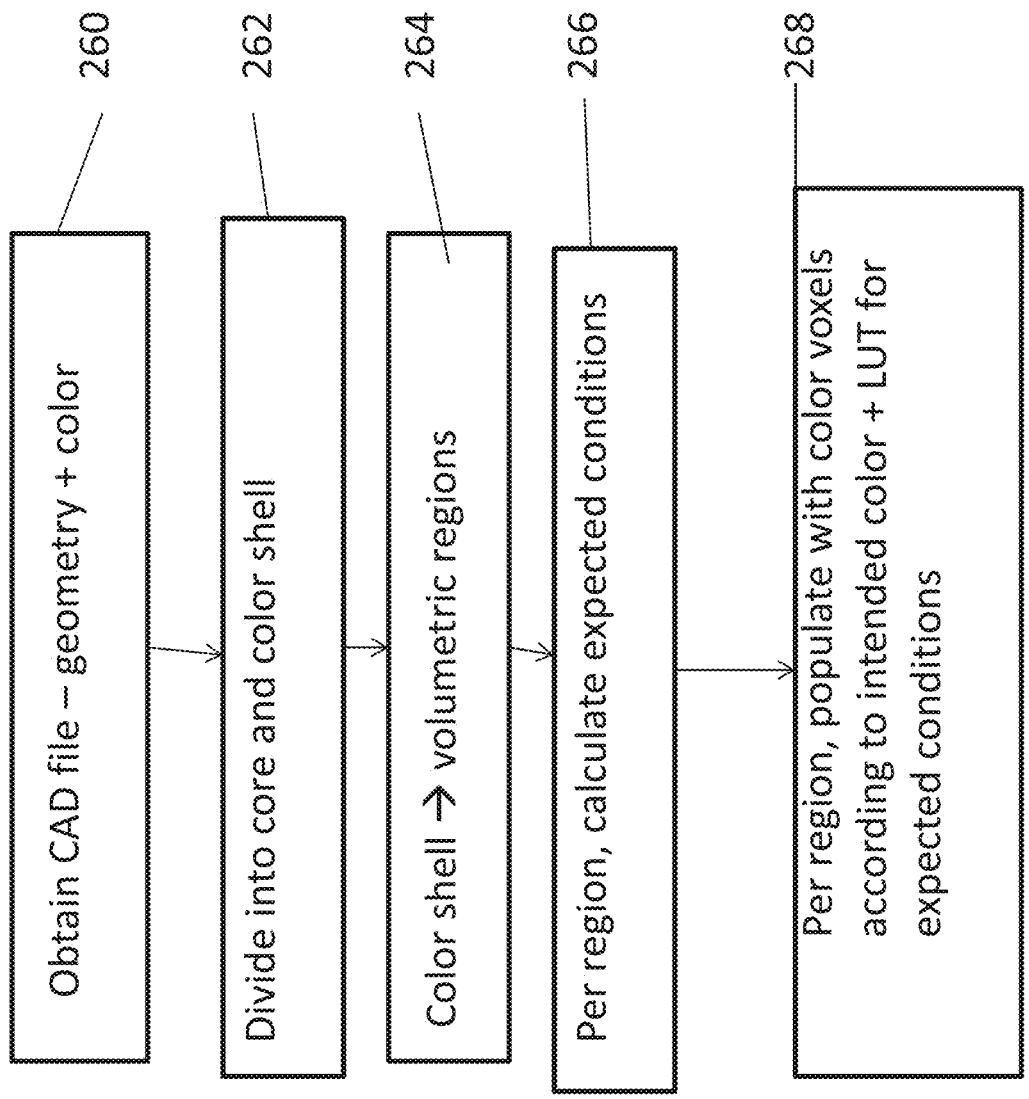

Reference is now made to FIG. 12, which illustrates using the resulting LUTs to calculate the required printed colors composition for each region of the geometry, according to its expected printing conditions.

Box 260 indicates receiving the CAD file describing a 3D geometry and the corresponding requested color value.

Optional stage 262 indicates dividing the geometry into a core and an outer shell.

Box 264 indicates dividing the geometry into regions. Optionally, only the outer shell of the geometry will be divided into regions.

For each region box 266 indicates calculating the expected printing conditions.

Each region is then populated with voxels of parent color materials, while calculating the printed colors composition according to the LUTs that corresponds to the expected printing conditions of the region.

Reference is now made to FIG. 13, which is a simplified flow chart illustrating a further embodiment of the present invention. In FIG. 13 a further method of dealing with errors comprises determining whether the model 300 contains 302 bright colors or colors of high luminance. If so then the model is divided 304 into three layers, an outer layer which is white, a middle layer in color, and the core in white. This has benefit in quality on subtle color changes. The input may be a vignette, characterized by the absence of abrupt color changes between neighbouring locations. It is, however, a desirable attribute of the printing process that no such abrupt changes are introduced as an artifact when none existed in the input. Nevertheless the kind of errors discussed herein include artifacts that are introduced when there are abrupt changes between different light colors, those colors that are close to white. The use of white layers above and below may remove such artifacts.

In greater detail, the printing process introduces a strong non-linearity in color reproduction with light colors, so that the derivative of output color vs. input color is much larger than one. For example the function relating output colors vs. input color may be y=x to the power of ⅓, where both are normalized so they range from 0 to 1. The derivative of $y=x^{1/3}$ is $$y' = \frac{1}{3x^{\frac{2}{3}}}$$

which goes to infinity at x=0, so when x=0, $$\frac{dy}{dx} = \text{infinity.}$$

The solution is to modify the printing process as shown in FIG. 13.

In an embodiment there is no user control whatsoever. The system automatically detects that a color is close to 0, and applies the outlined solution.

The terms "comprises", "comprising", "includes", "including", "having" and their conjugates mean "including but not limited to".

The term "consisting of" means "including and limited to".

As used herein, the singular form "a", "an" and "the" include plural references unless the context clearly dictates otherwise.

It is appreciated that certain features of the invention, which are, for clarity, described in the context of separate embodiments, may also be provided in combination in a single embodiment, and the above description is to be construed as if this combination were explicitly written.

Conversely, various features of the invention, which are, for brevity, described in the context of a single embodiment, may also be provided separately or in any suitable subcombination or as suitable in any other described embodiment of the invention, and the above description is to be construed as if these separate embodiments were explicitly written. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A method of printing a three-dimensional (3D) color object comprising: constructing a lookup table (LUT) of color values against actual printed color composition under different printing conditions by:
   printing color calibration targets using actual printed color compositions while exposing to different printing conditions;
   measuring the resulting color value for each of said targets using a colorimetry device; and
   tabulating the measured color values against the actual printed color composition and the respective printing conditions
   obtaining a 3D CAD file defining a 3D geometry and a color texture for said color object;
   dividing said 3D geometry into a core and a color shell;
   dividing said color shell into volumetric regions;
   calculating expected printing conditions for each of the volumetric regions;
   populating each of the volumetric regions with color voxels providing an intended color according to said LUT of color values against actual printed color composition under different printing conditions; and
   printing said 3D color object.

2. The method of claim 1, wherein said printing conditions are selected from UV exposure level, sample orientation on tray, gloss/matte print mode, and any combination thereof.

3. The method of claim 1, wherein said actual printed color compositions are based on C, M, Y, white and black color materials.

4. The method of claim 1, wherein said color values are represented by one of RGB color coordinates, CIE Lab coordinates, HSL, LCH and Grey Values.

5. The method of claim 1, wherein the thickness of said color shell is calculated relative to an extinction depth of the color materials used.

6. A method of printing a three-dimensional (3D) color object comprising:
   constructing a lookup table (LUT) of color values against actual printed color composition under different printing conditions by:
   printing color calibration targets using actual printed color compositions while exposing to different printing conditions;
   measuring the resulting color value for each of said targets using a colorimetry device; and
   tabulating the measured color values against the actual printed color composition and the respective printing conditions obtaining a 3D CAD file defining a 3D geometry and a color value for said color object;
   dividing said 3D geometry into volumetric regions;
   calculating expected printing conditions for each of the volumetric regions;
   populating each of the volumetric regions with color voxels providing an intended color according to said LUT of color values against actual printed color composition under different printing conditions; and
   printing said 3D color object.

7. The method of claim 6, wherein said printing conditions are selected from UV exposure level, sample orientation on tray, gloss/matte print mode, and any combination thereof.

8. The method of claim 6, wherein said actual printed color compositions are based on C, M, Y, white and black color materials.

9. The method of claim 6, wherein said color values are represented by one of RGB color coordinates, CIE Lab coordinates, HSL, LCH and Grey Values.

* * * * *